United States Patent
Thompson, Jr.

(10) Patent No.: US 8,123,988 B2
(45) Date of Patent: Feb. 28, 2012

(54) WOOD TREATMENT COMPOSITION AND PROCESS

(76) Inventor: Patrick Martin Thompson, Jr., Nashville, TN (US)

( * ) Notice: Subject to any disclaimer, the term of this patent is extended or adjusted under 35 U.S.C. 154(b) by 0 days.

(21) Appl. No.: 12/837,393

(22) Filed: Jul. 15, 2010

(65) Prior Publication Data

US 2010/0280154 A1    Nov. 4, 2010

Related U.S. Application Data

(62) Division of application No. 11/582,768, filed on Oct. 17, 2006, now abandoned.

(60) Provisional application No. 60/741,187, filed on Nov. 30, 2005, provisional application No. 60/750,951, filed on Dec. 16, 2005.

(51) Int. Cl.
  C09K 21/00 (2006.01)
  B32B 21/02 (2006.01)
  B32B 21/10 (2006.01)
  D21J 1/00 (2006.01)

(52) U.S. Cl. ............... 252/607; 252/601; 428/292.4

(58) Field of Classification Search .......... 252/601, 252/606–607; 428/292.4
See application file for complete search history.

(56) References Cited

U.S. PATENT DOCUMENTS

| | | | |
|---|---|---|---|
| 3,897,372 A | 7/1975 | Kehr et al. | |
| 4,039,645 A * | 8/1977 | Coyle | 264/118 |
| 4,130,458 A | 12/1978 | Moore et al. | |
| 4,246,146 A | 1/1981 | Wood et al. | |
| 4,311,554 A | 1/1982 | Herr | |
| 4,365,025 A | 12/1982 | Murch et al. | |
| 4,657,809 A | 4/1987 | Eskind | |
| 4,935,457 A | 6/1990 | Metzner et al. | |
| 5,188,785 A * | 2/1993 | Bauer et al. | 264/115 |
| 5,224,315 A | 7/1993 | Winter, IV | |
| 5,309,690 A | 5/1994 | Symons | |
| 5,480,587 A | 1/1996 | Musselman et al. | |
| 5,705,001 A * | 1/1998 | Iwata et al. | 156/62.2 |
| 5,723,020 A | 3/1998 | Robinson et al. | |
| 5,948,706 A | 9/1999 | Riedel et al. | |
| 5,953,880 A | 9/1999 | De Zen | |
| 6,153,668 A | 11/2000 | Gestner et al. | |
| 6,153,674 A | 11/2000 | Landin et al. | |
| 6,306,317 B1 | 10/2001 | Richards et al. | |
| 6,391,958 B1 | 5/2002 | Luongo et al. | |
| 6,416,789 B1 * | 7/2002 | Marks et al. | 424/641 |
| 6,420,493 B1 | 7/2002 | Ryckis-Kite et al. | |
| 6,423,251 B1 | 7/2002 | Blount et al. | |
| 6,455,622 B1 | 9/2002 | Winterowd et al. | |
| 6,491,850 B1 | 12/2002 | Blount et al. | |
| 6,517,748 B2 * | 2/2003 | Richards et al. | 252/607 |
| 6,702,969 B2 * | 3/2004 | Matuana et al. | 264/122 |
| 6,833,174 B2 | 12/2004 | Schuren et al. | |
| 6,881,247 B2 | 4/2005 | Batdorf et al. | |
| 6,886,306 B2 | 5/2005 | Churchill et al. | |
| 6,998,433 B2 | 2/2006 | Overholt et al. | |
| 2001/0001218 A1 | 5/2001 | Luongo | |
| 2001/0023276 A1 | 9/2001 | Schoenfeld | |
| 2003/0064230 A1 * | 4/2003 | Liu et al. | 428/425.1 |
| 2004/0121114 A1 | 6/2004 | Piana et al. | |
| 2005/0113500 A1 | 5/2005 | Okoshi et al. | |

FOREIGN PATENT DOCUMENTS

WO    WO 2006016416 A1 *    2/2006

* cited by examiner

*Primary Examiner* — Lorna M Douyon
*Assistant Examiner* — Tanisha Diggs
(74) *Attorney, Agent, or Firm* — PatentBest; Andrew McAleavey

(57) ABSTRACT

The present invention comprises a fire resistant wood product and method of manufacture thereof. In one embodiment, the fire resistant wood product comprises a resin and a fire retardant composition, wherein the resin comprises an isocyanate and the fire retardant composition comprises a boron containing compound.

7 Claims, No Drawings

WOOD TREATMENT COMPOSITION AND PROCESS

CROSS-REFERENCE TO RELATED APPLICATIONS

This application is a divisional of U.S. patent application Ser. No. 11/582,768, filed Oct. 17, 2006, now abandoned. That application claims priority to, and the benefit of, U.S. Provisional Patent Application Nos. 60/741,187, filed Nov. 30, 2005, and 60/750,951, filed Dec. 16, 2005.

FIELD OF THE INVENTION

The present invention relates to fire retardant Oriented Strand Boards ("OSB"). More specifically, the present invention relates to the manufacture of fire retardant OSBs.

BACKGROUND OF THE INVENTION

Oriented Strand Board (OSB) mills are highly automated and operate under a highly controlled manufacturing process. The goal of each mill is to produce as many boards as possible while maintaining board properties. As OSB products have become a preferred wood choice among builders and contractors, there has been an increased demand for OSB products with certain characteristics. These characteristics include fire retardancy, termite and fungal protection, moisture resistance, as well as others.

Due to the strictness of the OSB production process, there are limited opportunities to develop specialty boards. Additionally, since OSB is comprised of wood chips and resins, it is more difficult to impregnate the wood chips with the desired chemical formulation. As a result, specialty manufacturing of OSB is limited, specifically as it relates to fire retardant OSBs.

Current fire retardant boards utilize fire retardant formulations comprising phosphorous containing compounds, which has been found to lead to the thermal degradation of fire retardant wood products, including OSBs. In order to alleviate this concern, some fire retardant formulations have substituted phosphorous compounds with boron containing compounds. Unfortunately, boron containing formulations have been found to crosslink with the commonly used resins that are applied to the wood during the manufacturing process, causing the resulting boards to weaken and fall apart.

Accordingly, when boron containing compounds have been used, other compounds are added to counteract this reaction. For example, in U.S. Pat. No. 6,517,748, nitrogen containing organic compounds were added to the boron compounds at a ratio of 1.25:1.00 to 1.75:1.00, respectively.

Accordingly, there exists a need for an improved resin and fire retardant chemical formulation for producing fire retardant OSBs. There also exists a need for an improved process for applying fire retardant formulations to OSB precursor material that utilizes the existing OSB manufacturing process without impacting time or strength of the resulting boards.

SUMMARY OF THE PRESENT INVENTION

The present invention comprises a method for impregnating a fire retardant formulation into a wood containing product comprising a resin, wherein the resin comprises an isocyanate, and the fire retardant formulation comprises a boron containing compound, and each are applied to the wood product during the manufacturing process.

The present invention further comprises a composition comprising a boron containing compound and a metal hydroxide.

Still further, the present invention includes a composite wood product comprising wood precursor material, a fire retardant composition comprising a boron containing compound and a resin that does not crosslink in the presence of the boron containing compound.

DESCRIPTION OF THE PREFERRED EMBODIMENTS

For purposes of this invention, the term "fire retardant" refers to a composition which, when impregnated into wood products, at levels commonly observed in the wood processing industry, imparts a measurable level of fire retardance to the wood product. Fire retardants thus include all compounds which, when applied to cellulose containing materials, result in treated cellulose containing materials which will not burn, or such treated materials will burn to a lesser degree than untreated materials, or the burning of such treated materials will be limited to a smaller area when compared to untreated materials.

In a preferred embodiment of the present invention, a fire retardant composition comprises either an aqueous composition, dry mixture, or combination of an aqueous composition and a dry composition for use in impregnating wood chips, fragments, fibers, pieces and the like ("precursor material"). In accordance with the present invention, the fire retardant composition comprises a boron containing compound, for example, boric acid, boric oxide, and alkaline borates such as sodium octaborate in an aqueous or dry formulation. It is preferable that the boron containing compound comprise disodium octaborate tetrahydrate [$Na_2B_8O_{13} \cdot 4H_2O$] ("DOT"). Group IIA and IIIA metal salts, such as hydroxides and sulfates may also be added to the composition, thereby reducing the amount of boron containing compound needed in the fire retardant composition of the present invention. Preferred salts include metal hydroxides from the Group IIA (alkaline-earth metals) or Group IIIA elements, for instance aluminum, calcium, or magnesium oxide, and more preferably an Aluminum Trihydrate [$Al(OH)_3$], also referred to as Aluminum Hydroxide or Aluminum Trioxide.

Additionally, a variety of surfactants may also be added to the composition. A surfactant is defined as a substance that exhibits the following properties in water: (1) reduces the interfacial tension, and (2) self-assembles in solution at low concentrations. Addition of a surfactant to an aqueous fire retardant composition in accordance with the present invention allows the composition to absorb easier into the wood product during the manufacturing process. The surfactants to be used in the present composition can be cationic, anionic, uncharged, or amphoteric. Examples of suitable surfactants can be found in McCutcheon, Emulsifiers & Detergents, North American Edition, Vol. 1 (1994), which include dimethyl sulfoxide and glycerin. It is preferable that the surfactants be in a concentration range from about 10% w/w to about 90% w/w. It is also preferable that an added surfactant be about 1% of the fire retardant composition of the present invention. The exact choice of surfactant depends on various factors including the intended use of the wood product and other ingredients that might also be added to the composition.

Once impregnated in the precursor material, it is preferable that the weight of the fire retardant composition be in the range of about 8% to 20%, e.g., 18%, of the weight of the resulting wood product, for example, an oriented strand board ("OSB"). For example, in order to produce a class A OSB, it is preferable to have the weight of the fire retardant composition in the range of 10% to 15% of the weight of the board.

In a preferred embodiment, the fire retardant formulation comprises disodium octaborate tetrahydrate in a powder form. The fire retardant is applied to the wood product in accordance with the methods set forth below such that the fire retardant is 18% to 20% of the weight of the treated wood product.

In an alternative embodiment, the fire retardant formulation comprises a mixture of alumina trihydrate and disodium octaborate tetrahydrate, each in powder form. Preferably the concentration ranges for this embodiment are as follows: the alumina trihydrate in the composition ranges from about 5%-50% of the composition, and the disodium octaborate tetrahydrate ranges from about 50%-95% of the composition, for example, 25% alumina trihydrate and 75% disodium octaborate tetrahydrate.

In accordance with this embodiment, the fire retardant formulation may also be in liquid form. An aqueous alumina trihydrate/disodium octaborate tetrahydrate composition can be formulated by the following process: 1) heating the alumina trihydrate/disodium octaborate tetrahydrate composition (in powder form) to about the range of 60° C. to 90° C.; and 2) adding water and preferably a surfactant. The resulting fire retardant solution, alumina trihydrate/disodium octaborate tetrahydrate, is preferably formulated in accordance with the ratios described above. As those skilled in the art know, by heating the composition prior to adding to the water, the boron containing compound is more soluble in water, resulting is a more effective fire retardant solution. It should be noted that this composition can be formulated by first heating the water, and then adding the surfactant and alumina trihydrate/disodium octaborate tetrahydrate composition powder thereto. When aqueous, it is preferable that the fire retardant composition has a solid:water (w/w) content in a ratio ranging from 90:10 w/w to about 70:30 w/w.

In yet another alternative embodiment, a fire retardant composition comprises alumina trihydrate, in powder form, and disodium octaborate tetrahydrate, in liquid form. Preferably, the concentration ranges for each is similar to those set forth above alumina trihydrate (powder form) range from about 10-40% of the composition, and the disodium octaborate tetrahydrate (liquid form) ranges from about 60-95% of the composition.

The solid fire retardant compositions according to the present invention satisfy one or more of the following physical attributes: (1) particle sphericity, (2) uniformity of size distribution, (3) flowability, (4) average particle size less than 50 microns, (5) substantial absence of fines, and (6) uniformity of composition. Particles with such attributes are especially well adapted for use in the impregnation of cellulosic materials, including the manufacture of composite wood products.

Methods of Applying Fire Retardant Formulations to OSB Precursor Material

Methods of applying fire retardant formulations to OSB precursor materials include, but are not limited to, saturation tanks, dusting, and spraying.

During the OSB manufacturing process, the OSB precursor materials are blended with a resin. In a preferred embodiment of the present invention, the resin comprises an isocyanate, preferably, diphenylmethane diisocyanate or polymeric diphenylmethane diisocyanate, for binding the precursor material. Use of an isocyanate eliminates the crosslinking that results from other forms of resin when applied to OSB precursors along with a fire retardant formulation comprising boron containing compounds. It should be noted that other resins that do not crosslink in the presence of boron containing compounds can also be used.

In accordance with a preferred embodiment of the present invention, a method of treating the OSB precursor materials comprises spraying the OSB precursor materials that have been blended with a resin with a boron containing solution, preferably Disodium Octaborate Tetrahydrate (in liquid form), as they fall through the forming heads on a manufacturing line. Alternatively, the boron containing solution can comprise aluminum trihydrate and disodium octaborate tetrahydrate.

With OSB production, once the precursor materials are blended with the resin e.g., they are sent through the forming lines. There are typically four forming lines (1 for each surface, 2 for the core) for this process. These lines assimilate the chips, etc., in a uniform manner to produce desired strength characteristics of OSB. As the chips fall through the forming line, the desired chemical solution is pushed onto chips at the forming head. At this point, the OSB precursor materials, blended with a resin, have now been treated with the desired fire retardant solution and are now ready to be pressed.

It should be noted that the fire retardant solution of the present invention could be applied to the precursor material at any point in the OSB process, including, but not limited to, prior to blending the precursor material with the resin.

In accordance with an alternative embodiment, a method for manufacturing fire retardant OSB comprises adding alumina trihydrate (in powder form) to wood chips after the chips have been dried and prior to the chips entering the blending phase. The chips are then mixed in with resins in the blender and moved to the forming lines, where the liquid disodium octaborate tetrahydrate solution is applied to the blended wood chips. The boards are then pressed, producing fire retardant OSB. Although, the disodium octaborate tetrahydrate is applied separate from the alumina trihydrate, other means of applying this mixture can be used, for example, applying both of the compounds to the chips prior to the chips entering the blending phase or applying both during the blending phase.

Alternatively, the method set forth above comprises adding DOT in powder form, or the combined composition of alumina trihydrate and DOT in powder form, to the wood chips prior to blending the wood chips with the resin in accordance with the above method. Again, each of these powder compositions may be applied to the wood chips prior to, or during, the blending phase.

Yet another process for manufacturing fire retardant OSB comprises heating a mixture of disodium octaborate tetrahydrate in powder form, to a temperature of about 60° C. to about 90° C., wherein the mixture has fire retardant properties. Water is added to the powder mixture which is then applied to the wood chips after the chips have been dried. The chips are than blended with resins, formed, and pressed, producing a fire retardant OSB.

The above description is for purposes of illustration only and are not intended to be, and should not be construed as, limitations on the invention. Moreover, certain modifications or alternatives may suggest themselves to those skilled in the art upon reading of this specification, all of which are intended to be within the spirit and scope of the present invention as defined in the attached claims.

What is claimed is:

1. A method of manufacturing a fire-retardant, treated oriented strand board, comprising:

applying a fire retardant solution to a wood precursor material, the fire retardant solution consisting of
a boron containing compound, a metal hydroxide in an amount of 5-50% by weight of the fire retardant solution, and a surfactant in an amount of about 1% by weight of the fire retardant solution, to create a treated wood precursor material;

blending the treated wood precursor material with an isocyanate binder resin; and forming the blended, treated wood precursor material into the oriented strand board, wherein the boron containing compound is present in an amount of 8% to 20% by weight of the treated oriented strand board.

2. The method of claim 1, wherein the boron-containing compound is disodium octaborate tetrahydrate.

3. The method of claim 1, wherein the isocyanate binder resin is diphenylmethane diisocyanate.

4. The method of claim 1, wherein the metal hydroxide is aluminum hydroxide.

5. The method of claim 1, further comprising forming the fire retardant solution by a process including:

heating at least one of the boron-containing compound or water to a temperature in the range of 60-90° C.; and mixing the boron-containing compound and the water.

6. The method of claim 1, wherein the boron-containing compound is present in an amount in the range of 10% to 15% of the weight of the oriented strand board.

7. The method of claim 1, wherein the surfactant is dimethyl sulfoxide or glycerin.

* * * * *